(12) United States Patent
Landmér (10) Patent No.: US 8,728,211 B2
(45) Date of Patent: May 20, 2014

(54) NOZZLE FOR SPRAYING LIQUID AND A MIXER COMPRISING THE NOZZLE

(75) Inventor: Per Hakan Fredrik Landmér, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 314 days.

(21) Appl. No.: 13/435,394

(22) Filed: Mar. 30, 2012

(65) Prior Publication Data

US 2013/0255494 A1 Oct. 3, 2013

(51) Int. Cl.
*B01F 3/04* (2006.01)
*B01D 53/14* (2006.01)
*B05B 17/04* (2006.01)

(52) U.S. Cl.
USPC .............. 95/217; 95/230; 261/78.2; 261/118; 239/11

(58) Field of Classification Search
USPC ........... 95/149, 216, 217, 230; 261/78.2, 118; 239/11
See application file for complete search history.

(56) References Cited

U.S. PATENT DOCUMENTS 5,285,965 A 2/1994 McCutcheon et al.
8,567,699 B2 * 10/2013 Sesser et al. .................. 239/252

FOREIGN PATENT DOCUMENTS

WO 96/16722 6/1996

* cited by examiner

*Primary Examiner* — Robert A Hopkins
(74) *Attorney, Agent, or Firm* — Rita D. Vacca (57) ABSTRACT

A nozzle for spraying a liquid, comprising a central body which comprises a connecting portion for connecting the nozzle to a supply of liquid, an atomizing portion forming droplets of the liquid, and a liquid supply pipe forwarding liquid to the atomizing portion. The nozzle further comprises a sleeve mounted on the central body, the sleeve comprising a central aperture, which at least partly encloses the atomizing portion of the central body, and a spray angle controlling rim which at least partly encircles the atomizing portion.

20 Claims, 5 Drawing Sheets

NOZZLE FOR SPRAYING LIQUID AND A MIXER COMPRISING THE NOZZLE

FIELD OF THE INVENTION

The present disclosure relates to a nozzle for spraying a liquid. Such a nozzle may, for example, be arranged inside a mixer for moistening an absorbent material for removing gaseous pollutants from a hot process gas.

BACKGROUND ART

When separating gaseous pollutants from process gases, such as flue gases from a coal- or oil-fired fired power plant, a method is frequently used, in which a lime-containing absorbent material is introduced into the process gas to react with the gaseous pollutants. When the absorbent material reacts with the gaseous pollutants, the gaseous pollutants are converted chemically or physically into dust, which is then separated in a filter. WO 96/16722 discloses a method, in which lime-containing dust is mixed with water in a mixer and then introduced into a contact reactor to react with gaseous pollutants in a flue gas. Then the dust is separated in a filter and recirculated to the mixer to be mixed once more with water and subsequently again be introduced into the contact reactor.

It has now been found that the mixing of water and dust in the mixer is sometimes less efficient, which results in less efficient removal of gaseous pollutants from the process gases.

SUMMARY OF THE INVENTION

The object of the present disclosure is therefore to provide a nozzle which supplies liquid in a reliable and stable manner.

This object is achieved by a nozzle for spraying a liquid, the nozzle comprising:

a central body which comprises a connecting portion for connecting the nozzle to a supply of liquid, an atomizing portion forming droplets of the liquid, and a liquid supply pipe forwarding liquid from the connecting portion to the atomizing portion and comprising a first opening in the connecting portion and a second opening in the atomizing portion, wherein the atomizing portion comprises a deflecting plate extending from a starting portion, at which the deflecting plate is connected to the atomizing portion, to an end portion and arranged in the path of liquid ejected from the second opening to make the liquid flow over a deflection surface of the deflecting plate and form a spray, and wherein the nozzle further comprises a sleeve mounted on the central body, the sleeve comprising a central aperture, which at least partly encloses the atomizing portion of the central body, and a spray angle controlling rim which at least partly encircles the atomizing portion in a position located between the second opening and the end portion of the deflecting plate.

An advantage of this nozzle is that the spraying characteristics, such as the spray angle, are very constant when the liquid pressure supplied to the nozzle is varied. This makes it possible to vary the amount of liquid that is atomized by the nozzle over a wide range, with relatively small variations in the spray characteristics of the nozzle.

According to one embodiment, the nozzle is provided with a cleaning chamber defined by the atomizing portion and the central aperture of the sleeve. An advantage of this embodiment is that formation of dust aggregates, in particular in the area of the second opening, is reduced, since a flushing effect that keeps dust away from the area of the second opening is achieved.

According to one embodiment, a portion of the deflection surface of the deflecting plate forms at least a portion of a side wall of the cleaning chamber. An advantage of this embodiment is that the liquid starts to spread out over the deflection surface already inside of the cleaning chamber, the cleaning chamber providing a cleaning environment, which reduces the risk of formation of dust deposits on the deflection surface. Furthermore, with the liquid spreading out over the deflection surface inside the cleaning chamber, the spray angle controlling rim may more efficiently control the spray angle of the nozzle.

According to one embodiment, the deflection surface has a surface roughness, $R_a$, of 0.01 to 2.0 micrometer. An advantage of this embodiment is that the liquid will flow in a relatively undisturbed manner over the deflection surface. This reduces the risks of liquid splashing uncontrolled from the deflection surface, and/or liquid being released from the deflection surface in an uncontrolled manner, which is an advantage, in particular in situations of spraying in confined spaces, where uncontrolled splashing may cause wet areas in unwanted positions.

According to one embodiment, an angle $\alpha$ between the deflection surface and a centre line of the liquid supply pipe is in the range of 15-25°. An advantage of this embodiment is that such range has proven to provide for a relatively well-controlled and well-defined liquid spray pattern, with minimum splashing of liquid.

According to one embodiment, the deflecting plate has lateral edges extending from the deflection surface at an angle $\gamma$ of 10-40° to a normal line of the deflection surface. An advantage of this embodiment is that it has proven to provide for a relatively efficient release of liquid that has passed over the deflection surface. This reduces the splashing of liquid from the edges of the deflection surface, and reduces the risk of liquid wetting the backside of the deflecting plate. The latter is an advantage because such wetting could cause build up of deposits of dust on the nozzle.

According to one embodiment, the spray angle controlling rim of the sleeve has an edge which forms an angle $\beta$ of 20-60° to a centre line of the sleeve. An advantage of this embodiment is that a relatively sharp and well-controlled spray angle is obtained. Furthermore, the risk of liquid unintentionally wetting the outside of the sleeve is reduced.

According to one embodiment, the edge of the spray angle controlling rim is inclined inwardly towards the centre line of the sleeve. An advantage of this embodiment is that the spray of liquid is subjected to a very well-defined edge, providing a well-defined spray angle.

According to one embodiment, a shortest distance between lateral edges of the deflecting plate and the spray angle controlling rim is 0 to 0.5 mm. An advantage of this embodiment is that liquid is prevented, at least partly, from passing between the deflecting plate and the sleeve. This reduces the risk of liquid wetting the backside of the deflecting plate.

According to a further aspect of the present disclosure, there is provided a nozzle comprising a central body which comprises a connecting portion for connecting the nozzle to a supply of liquid, an atomizing portion forming droplets of the liquid, and a liquid supply pipe forwarding liquid to the atomizing portion, and a sleeve mounted on the central body, the sleeve comprising a central aperture, which at least partly encloses the atomizing portion of the central body, and a spray angle controlling rim which at least partly encircles the atomizing portion. The liquid supply pipe supplies the liquid within the central aperture of the sleeve.

An advantage of this nozzle is that the spray angle of the nozzle will vary within a relatively narrow range when the pressure of liquid supplied to the nozzle is varied.

According to a further aspect of the present disclosure, there is provided a mixer for moistening absorbent material for use in removing gaseous pollutants from a hot process gas comprises at least one nozzle for spraying liquid onto absorbent material present inside of the mixer, the nozzle comprising:

a central body which comprises a connecting portion for connecting the nozzle to a supply of liquid, an atomizing portion forming droplets of the liquid, and a liquid supply pipe forwarding liquid to the atomizing portion, and a sleeve mounted on the central body, the sleeve comprising a central aperture, which at least partly encloses the atomizing portion of the central body, and a spray angle controlling rim which at least partly encircles the atomizing portion, wherein the liquid supply pipe supplies the liquid within the central aperture of the sleeve.

An advantage of the mixer being provided with such nozzle is that the moistening of the absorbent material will be efficient, with little or no water being unintentionally sprayed onto internal structures of the mixer. Furthermore, changes in the amount of water required for moistening the dust can be handled by varying the water pressure supplied to the nozzle, without substantially influencing the spray angle or the spray pattern of the nozzle.

According to a yet further aspect of the present disclosure, there is provided a method of atomizing a liquid, comprising supplying a liquid to a nozzle comprising:

a central body which comprises a connecting portion for connecting the nozzle to a supply of liquid, an atomizing portion forming droplets of the liquid, and a liquid supply pipe forwarding liquid to the atomizing portion, and a sleeve mounted on the central body, the sleeve comprising a central aperture, which at least partly encloses the atomizing portion of the central body, and a spray angle controlling rim which at least partly encircles the atomizing portion, wherein the liquid supply pipe supplies the liquid within the central aperture of the sleeve, and wherein the liquid is supplied to the nozzle and is atomized by the nozzle to form an essentially flat spray of liquid droplets.

According to a still further aspect of the present disclosure, there is provided a method of moistening absorbent material for use in removing gaseous pollutants from a process gas, the method comprising using a mixer having at least one nozzle for spraying liquid onto absorbent material present inside of the mixer, the nozzle comprising:

a central body which comprises a connecting portion for connecting the nozzle to a supply of liquid, an atomizing portion forming droplets of the liquid, and a liquid supply pipe forwarding liquid to the atomizing portion, and a sleeve mounted on the central body, the sleeve comprising a central aperture, which at least partly encloses the atomizing portion of the central body, and a spray angle controlling rim which at least partly encircles the atomizing portion, wherein the liquid supply pipe supplies the liquid within the central aperture of the sleeve, and wherein the liquid is supplied to the nozzle and is atomized by the nozzle to moisten at least a portion of the absorbent material present inside the mixer.

Further advantages and features of the invention will be evident from the following description and the appended claims.

BRIEF DESCRIPTION OF THE DRAWINGS

The invention will now be described in more detail by way of exemplary embodiments and with reference to the accompanying drawings.

FIG. 7 is a cross-section and illustrates the nozzle as seen in the direction of the arrows VII-VII of FIG. 6a

DESCRIPTION OF PREFERRED EMBODIMENTS

Figure 1:
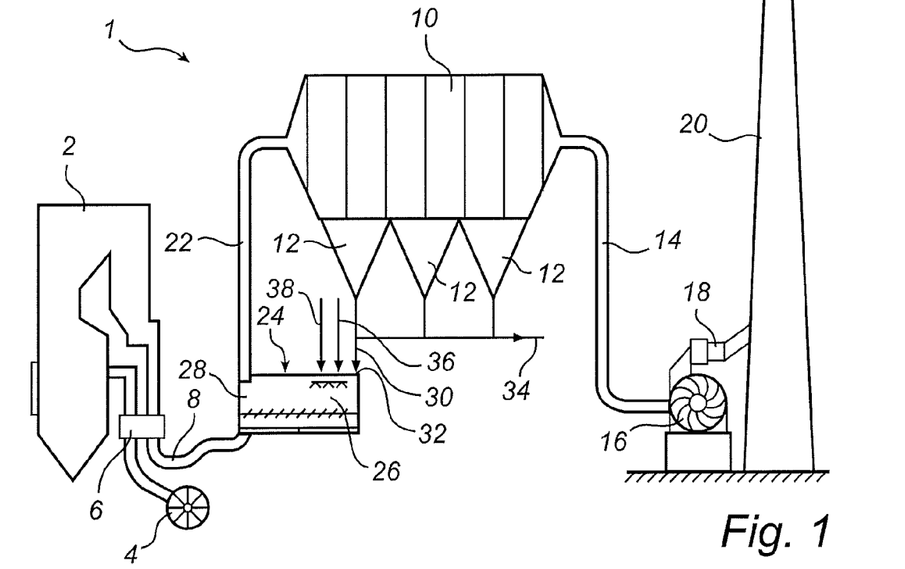
FIG. 1 is a schematic side view of a power plant which is provided with equipment for cleaning flue gases.

FIG. 1 shows schematically a power plant 1. The power plant 1 has a coal-fired boiler 2 to which a gas containing oxygen is fed by means of a fan 4 and a preheater 6. Hot process gases, which may be referred to as flue gases and which contain dust, such as fly ash, and gaseous pollutants, such as sulfur dioxide, are produced in the boiler 2. The hot flue gases are passed in a duct 8 through the preheater 6, in which the flue gases exchange heat with the oxygen containing gas coming from the fan 4, to a dust separator in the form of a fabric filter 10. Dust is separated from the flue gases in the fabric filter 10 and is collected in three dust hoppers 12 of the fabric filter 10. The cleaned flue gas leaves the fabric filter 10 through a duct 14 and is fed by means of a fan 16 through a duct 18 to a stack 20 to be emitted into the atmosphere.

The duct 8 has a vertical duct portion which constitutes a contact reactor 22. A mixer 24 communicates with the contact reactor 22 in the lower part thereof. The mixer 24 has a first end 26 and a second end 28. A circulating part of the dust collected in the dust hoppers 12 is fed through a chute 30 to an inlet 32 located at the first end 26 of the mixer 24. A small amount of the dust collected in the dust hoppers 12 is fed through a duct 34 for processing or land filling. Fresh absorbent material in the form of, for example, burnt lime, CaO, is fed through a chute 36, and a liquid, which may typically be process water, is supplied via a water supply pipe 38.

Figure 2:
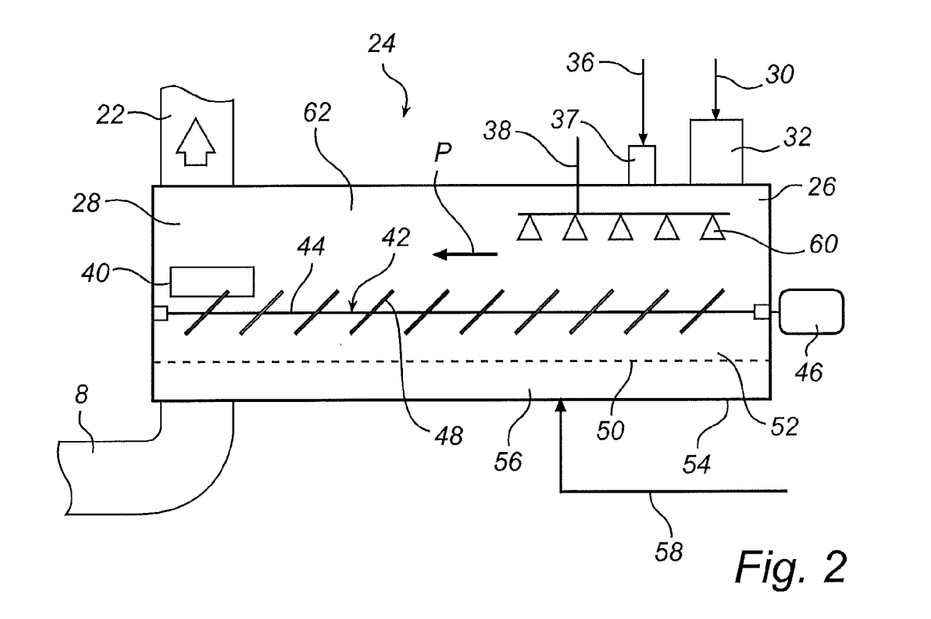
FIG. 2 is a schematic cross-sectional view of a mixer according to FIG. 1 in detail.

FIG. 2 illustrates the mixer 24 in more detail. The circulating part of the dust collected in the dust hoppers 12 is fed through the chute 30 to the inlet 32 located at the first end 26 of the mixer 24. The fresh absorbent material is fed through the chute 36 into the mixer 24 through an absorbent inlet 37 located at the first end 26 of the mixer. At the second end 28, the mixer 24 has an outlet 40 formed as an overflow intended for moistened absorbent material. Hence, the dust will be forwarded, in a direction indicated by an arrow P, from the first end 26 to the second end 28 of the mixer 24 while being moistened. Part of the second end 28 of the mixer 24 is placed inside the contact reactor 22 in such a manner that moistened absorbent material leaving the mixer 24 through the outlet 40 will be entrained by the flue gas flowing upwards in the contact reactor 22.

The mixer 24 has a mechanical stirrer 42 which has a shaft 44 extending from the first end 26 to the second end 28 and journalled in bearings in the respective ends 26, 28. A motor 46 is arranged to rotate the shaft 44 and agitating devices, such as inclined, elliptic discs or paddles 48, that are fixedly connected to the shaft 44.

A gas-permeable cloth 50 is fixed in the lower portion 52 of the mixer 24. The space between the cloth 50 and a bottom 54 of the mixer 24 forms a chamber 56. An air pipe 58 is arranged to supply compressed air to the chamber 56. Since the cloth 50 is permeable to gas, the compressed air supplied through the fluidly connected pipe 58 will fluidize the supplied dust above the chamber 56 during the moistening and mixing thereof.

A number of nozzles 60 are arranged in interior 62 of the mixer 24 above the chamber 56. The water supply pipe 38 is arranged to supply water to the nozzles 60. The nozzles 60 atomize the water supplied thereto and forwards the water to the dust fluidized in the mixer 24 to cause a moistening of the dust prior to forwarding the dust to the contact reactor 22 in which the moistened dust will be mixed with the flue gases and react with gaseous pollutants contained in the flue gases.

Figure 3:
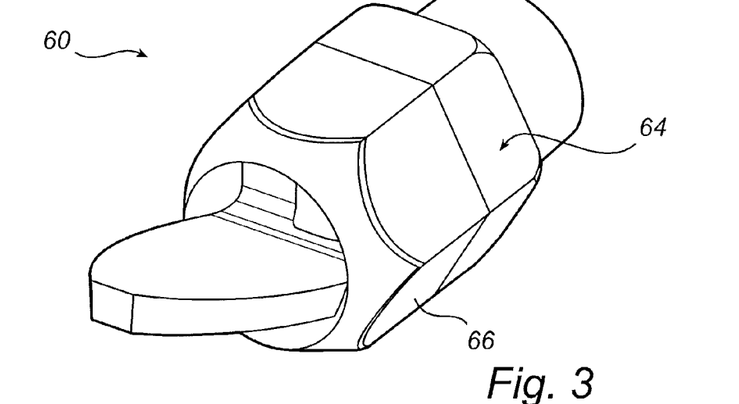
FIG. 3 is three-dimensional view of a nozzle of the mixer of FIG. 2.

FIG. 3 illustrates the nozzle 60 in a three-dimensional view. The environment in interior 62 of the mixer 24 illustrated in FIG. 2 is filled with dust and moisture, which would potentially cause clogging of the nozzle 60. The nozzle 60 is provided with several features, as will be described in more detail hereinafter, that reduces the risk of aggregates of moistened dust being formed on the nozzle 60 during operation of the mixer 24.

The nozzle 60 comprises a central body 64, which will be described in more detail hereinafter with reference to FIG. 4, and a sleeve 66, which will be described in more detail hereinafter with reference to FIG. 5.

Figures 4, 5:
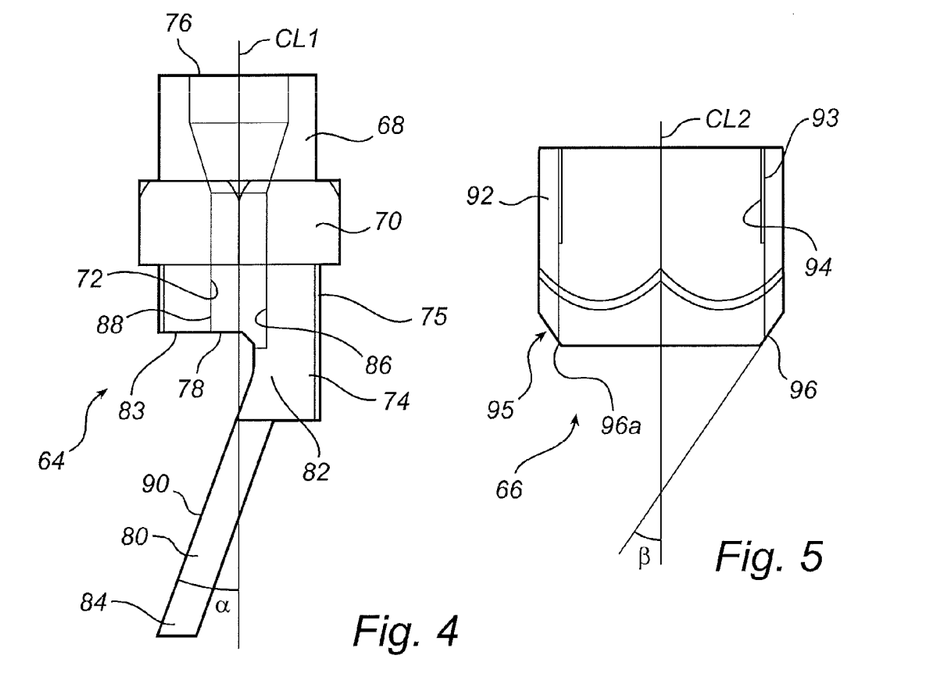
FIG. 4 is a side view of a central body of the nozzle of FIG. 3.
FIG. 5 is a side view of a sleeve of the nozzle of FIG. 3.

FIG. 4 illustrates the central body 64 as seen in a side view. The central body 64 comprises a connecting portion 68, which may, for example, be threaded, for connection to the water supply pipe 38 of FIGS. 1 and 2. The central body 64 further comprises a hexagonal mounting portion 70 adapted for cooperation with a wrench used for turning the central body 64 when mounting the same to the water supply pipe 38. A cylindrical liquid supply pipe 72 extends through the central body 64, from the connecting portion 68, at which the liquid supply pipe 72 is adapted to be fluidly connected to the water supply pipe 38, via the mounting portion 70, and further to an atomizing portion 74 of the central body 64. The water would typically be supplied to the liquid supply pipe 72 at a pressure of 0.7 to 10 bar above atmospheric pressure, and at a water temperature of typically 0 to 70° C. The atomizing portion 74 may be provided with a thread 75.

The liquid supply pipe 72 has a first opening 76 arranged at the connecting portion 68, and a second opening 78 arranged at the atomizing portion 74. The atomizing portion 74 comprises a deflecting plate 80. The deflecting plate 80 has a starting portion 82 and an end portion 84. The starting portion 82, at which the deflecting plate 80 is mounted to the atomizing portion 74, is arranged at a first side 86 of the liquid supply pipe 72. The deflecting plate 80 extends from the starting portion 82 and away from the second opening 78. The deflecting plate 80 points downwards, in the illustration of FIG. 4, and towards a second side 88 of the liquid supply pipe 72, to, hence, have the end portion 84 "cover" the second opening 78, when seen from below, in the perspective of FIG. 4.

The deflecting plate 80 has a deflection surface 90 which is sloped over the second opening 78. The deflection surface 90 of this embodiment is a plane surface. An angle α between the deflection surface 90 and a centre line CL1 of the liquid supply pipe 72 may typically be in the range of 15-25°. The angle α may for example be about 19°. The deflection surface 90 preferably has a surface roughness, $R_a$, of 0.01 to 2.0 micrometer, more preferably 0.05 to 1.2 micrometer.

FIG. 5 illustrates the sleeve 66 as seen in a side view. The sleeve 66 comprises a hexagonal mounting portion 92 and a central aperture 94 adapted for co-operation with the atomizing portion 74 of the central body 64 illustrated in FIG. 4. The central aperture 94 may optionally be provided with a thread 93 formed in its central aperture 94 for co-operation with the thread 75 of the atomizing portion 74 of the central body 64. Preferably, the optional thread 93 would only be arranged in the upper portion of the sleeve 92, as seen in FIG. 5.

The sleeve 66 is provided with a sharp edged spray angle controlling rim 95. An edge 96 of the rim 95 is inclined inwardly towards a centre line CL2 of the sleeve 66. An angle β between the edge 96 of the rim 95 and the centre line CL2 of the sleeve 66 may typically be in the range of 20-60°. The angle β may for example be about 30°. The edge 96 of the rim 95 ends in a circumferential end point 96a, which controls the spray angle of the nozzle 60.

Figure 6A:
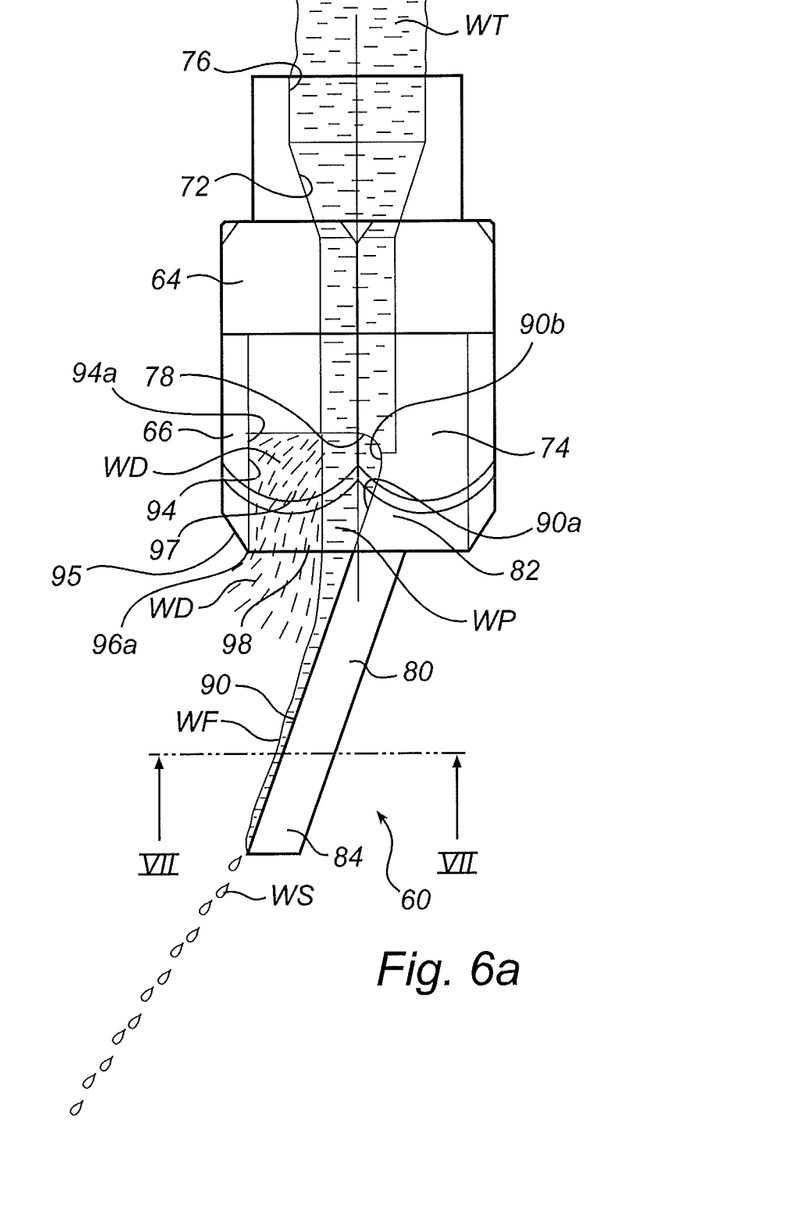
FIG. 6a is a side view of the complete nozzle.
Figure 6B:
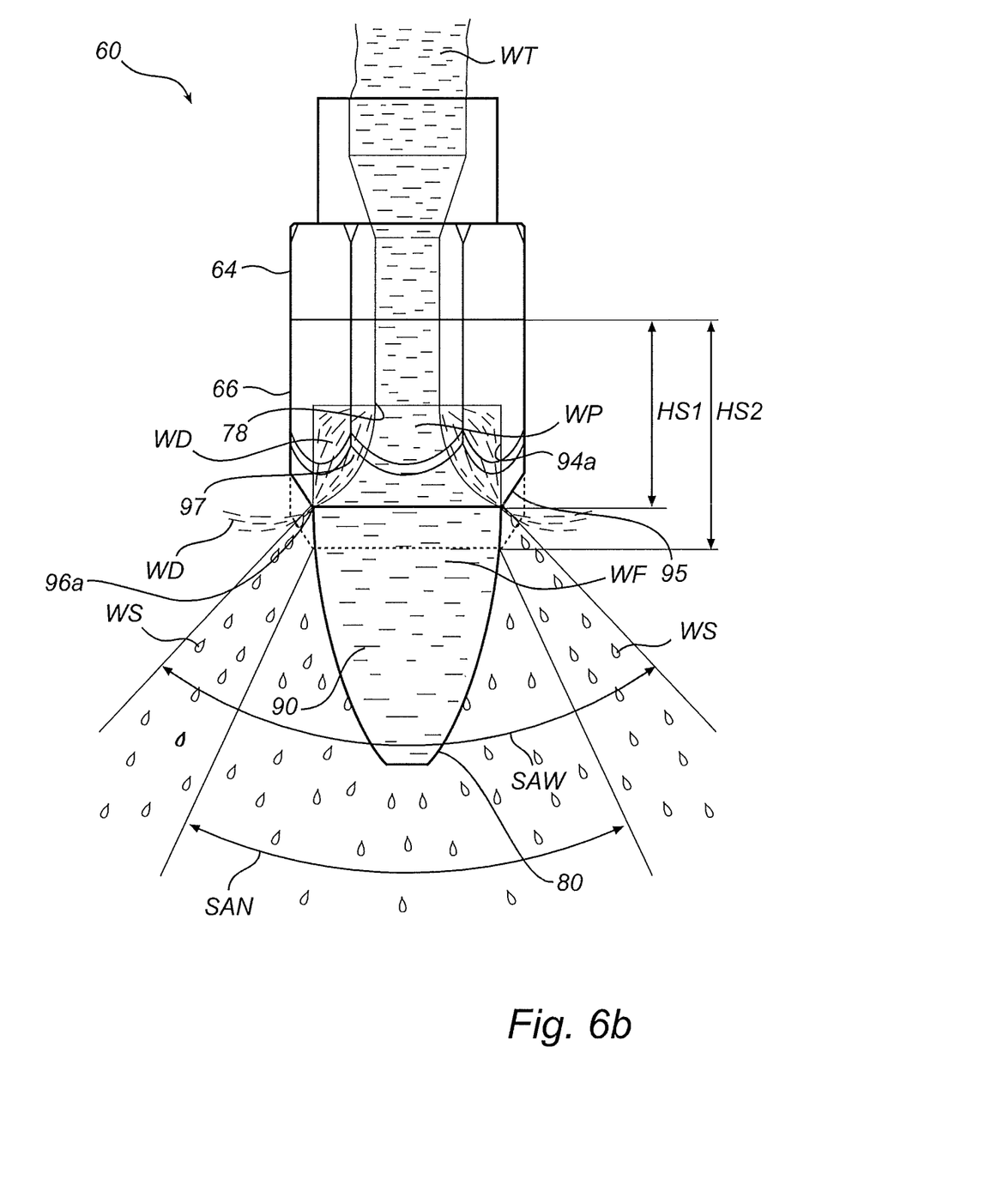
FIG. 6b is a front view of the complete nozzle.
Figure 7:
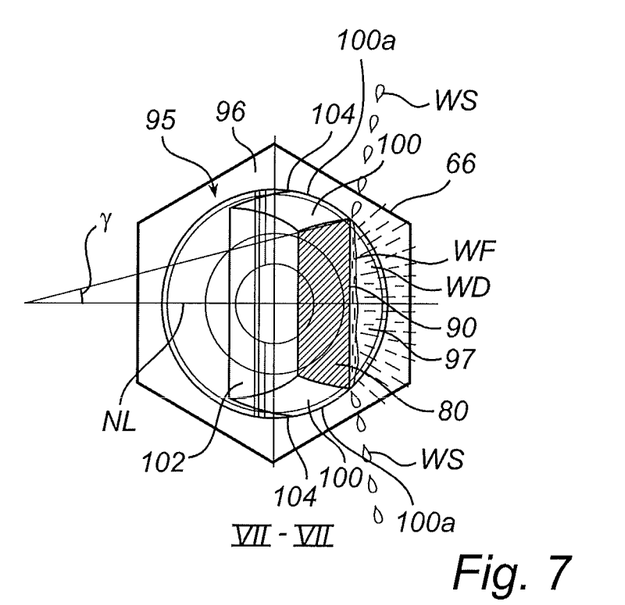

FIG. 6a illustrates the nozzle 60 in a side view, and FIG. 6b illustrates the nozzle 60 in a front view, with the sleeve 66 mounted on the central body 64. The sleeve 66 at least partly encloses the atomizing portion 74 of the central body 64. The nozzle 60 has a cleaning chamber 97. The cleaning chamber 97 is defined by the atomizing portion 74 with the starting portion 82 forming one side wall and a roof 83, illustrated in FIG. 4, of the cleaning chamber 97, and with the aperture 94 of the sleeve 66 forming the other side wall 94a of the cleaning chamber 97. A portion 90a of the deflection surface 90 of the deflecting plate 80 forms a portion of a side wall 90b of the cleaning chamber 97. The cleaning chamber 97 has an opening 98, directed downwards in the perspective illustrated in FIG. 6a.

As illustrated in FIGS. 6a and 6b the spray angle controlling rim 95 of the sleeve 66 encircles the atomizing portion 74 in a position which is located between the second opening 78 and the end portion 84 of the deflecting plate 80.

In operation water, WT, enters the liquid supply pipe 72 via the first opening 76 and is forwarded towards the second opening 78. At the second opening 78 water "pillar" WP is formed and moves towards the deflection surface 90 of the deflecting plate 80. Upon impingement with the deflection surface 90 the water pillar WP is transformed into a water film WF, having the shape of a flat liquid film, which flows downwards, as seen in the illustration of FIGS. 6a and 6b, and towards the sides of the deflection surface 90.

Typically, the impingement of the water pillar WP with the deflection surface 90 would occur at least partly at that portion 90a of the deflection surface 90 which is located inside of the cleaning chamber 97. Hence, deflection of the water pillar WP will start already inside the cleaning chamber 97, and inside the central aperture 94 of the sleeve 66. The edge 96a of the rim 95 will determine the angle of water film WF generated by the impingement of the water pillar WP against the deflection surface 90, and will, as will be described hereinafter, determine the spray angle of the nozzle 60. As the water film WF leaves the deflection surface 90 water droplets WS are formed as the water film WF breaks up, such water droplets WS moistening the dust present in the mixer 24 illustrated in FIG. 2. Hence, in a method of atomizing a liquid, the liquid is supplied to the nozzle 60 and is atomized by the nozzle 60 to form an essentially flat spray of liquid droplets, as illustrated in FIGS. 6a and 6b. Furthermore, in a method of moistening an absorbent material present inside of the mixer 24, illustrated in FIG. 2, for preparing the absorbent material for removal of gaseous pollutants of a flue gas, liquid, typically water, is supplied to one or more nozzles 60 arranged inside of the mixer 24, wherein the liquid supplied to the nozzle/-s 60 is atomized by the nozzle/-s 60 to moisten at least a portion of the absorbent material present inside the mixer 24.

A minor portion of the water WT may, upon being ejected via the second opening 78 of the liquid supply pipe 72, be deflected from the water pillar WT. A minor portion of the water film WF may also or alternatively be deflected upon interacting with the rim 95. Such deflected water portion/-s, WD, will cause a flushing of the interior of the cleaning chamber 97 and will prevent the build-up of any deposits in the area of the second opening 78. Typically the deflected water portion WD will amount to less than 3%, and typically 0.001 to 1%, of the total amount of water WT entering the nozzle 60 via the first opening 76. After such flushing inside of the cleaning chamber 97 the deflected water portion WD will leave the cleaning chamber 97 via the opening 98.

The vertical position, as seen in the illustrations of FIGS. 6*a* and 6*b*, at which the spray angle controlling rim 95 of the sleeve 66 encircles the atomizing portion 74 will influence the spray angle. Thus, the vertical position, as seen in FIGS. 6*a* and 6*b*, of the rim 95 between the second opening 78 and the end portion 84 of the deflecting plate 80 determines the spray angle of the nozzle 60. The position of the rim 95 is determined by the height of the sleeve 66. A low height HS1 of the sleeve 66 results in a relatively wide spray angle SAW, and a high height HS2 of the sleeve 66 results in a relatively narrow spray angle SAN, as best illustrated in FIG. 6*b*.

FIG. 7 illustrates the nozzle 60 as seen in the cross-sectional direction of the arrows VII-VII of FIG. 6*a*. The deflecting plate 80 has sharp lateral edges 100 extending backwards and towards each other from the deflection surface 90. The lateral edges 100 converge with the deflection surface 90 at respective point edges 100*a*. An angle γ between the respective lateral edge 100 of the deflecting plate 80 and a normal line NL, which is normal, i.e. at right angles, to the deflection surface 90, may typically be in the range of 10-40°, more typically in the range of 15-25°. The angle γ may for example be about 20°. Typically, the lateral edges 100 have a surface roughness, $R_a$, of 0.2 to 3 micrometer.

The water film WF flowing towards the sides of the deflection surface 90 will leave the deflection surface 90 at the transition from the deflection surface 90 to the respective lateral edges 100 and form water droplets WS. Thanks to the angle γ and the point edges 100*a* of the lateral edges 100 the water film WF will release very efficiently from the deflecting plate and only a relatively small portion, if any, of the water film WF will tend to “turn around the corner” and wet the backside 102 of the deflecting plate 80. If the backside 102 gets wet, dust, for example dust from a material treated in the mixer 24 of FIG. 2, may form aggregates on the backside 102. Eventually such dust aggregates may grow to the deflection surface 90 and deteriorate its function.

Points of transition 104 between the deflection surface 90 on the one hand and the edge 96 of the rim 95 on the other hand involves a tight-fitted transition between the sharp edged rim 95 and the sharp lateral edges 100. By “tight-fitted transition” is meant that a shortest distance between lateral edge 100 and the rim 95 is 0 to 0.5 mm, preferably 0 to 0.25 mm. For example, the end point 96*a* of the edge 96 of the rim 95 may be in direct contact with the point edges 100*a* of the lateral edges 100, such direct contact resulting in tight-fitted points of transitions 104 with a shortest distance between lateral edge 100 and the rim 95 of 0 mm. Such transitions 104, between sharp edges and with a tight fit, further reduces the amount of the water film WF, if any, that “turns around the corner” wetting the backside 102 of the deflecting plate 80. Furthermore, the tight fit keeps the deflected water portion, WD, confined in the cleaning chamber 97, such that the deflected water portion WD will not wet the backside 102.

Example

A test was performed to evaluate the influence of the water pressure on the spray angle. In particular when spraying in confined areas, such as in the mixer 24 illustrated in FIG. 2, it is important that the spray angle does not change significantly when varying the amount of water sprayed per unit of time. Varying the amount of water sprayed per unit of time is made by varying the water pressure. In the example, the nozzle 60 described hereinabove with reference to FIGS. 3-7 was compared to a nozzle of the type Spraying Systems Flatjet 5040 which is available from Spraying Systems Co. Wheaton, Ill., USA. Different water pressures (in bar overpressure, i.e. pressure above atmospheric), were supplied to the nozzles, and the spray angles, similar to angle SAW illustrated in FIG. 6*b*, were measured. The results are presented in Table 1, below.

TABLE 1

Spray angles of nozzles at various pressures.

| Water pressure [bar overpressure] | Spraying Systems Flatjet 5040 [spray angle in °] | Nozzle (60) of present disclosure [spray angle in °] |
|---|---|---|
| 0.7 | 38 | 44 |
| 1.5 | 45 | 52 |
| 2.0 | 47 | 56 |
| 3.0 | 50 | 56 |
| 4.0 | 52 | 56 |
| 6.0 | 53 | 56 |
| 7.0 | 55 | 56 |
| 8.0 | 57 | 56 |
| 9.0 | 58 | 56 |
| 10.0 | 58 | 56 |

From Table 1 it can be seen that increasing the pressure from 0.7 bar(o) to 10 bar(o) results in the spray angle increasing by 58−38=20° for the nozzle Spraying Systems Flatjet 5040, while the same increase in pressure for the nozzle 60 of the present disclosure only increases the spray angle by 56−44=12°.

Furthermore, the spray angle of the nozzle 60 of the present disclosure is completely constant at 56° within a water pressure range of 2 bar(o) and up to 10 bar(o). For the nozzle Spraying Systems Flatjet 5040 the spray angle increases from 47 to 58°, i.e. an increase by 11°, when increasing the water pressure from 2 bar(o) and up to 10 bar(o). Hence, with the nozzle 60 of the present disclosure, the spray angle is almost constant over a very broad water pressure range. This makes it relatively easy to predict which area within, for example, the mixer 24 that will be subjected to water spray from nozzle 60, regardless of the actual, and possibly varying, water pressure. Thereby, inadvertently spraying water at structures within interior 62 of mixer 24 that should not be wetted can be avoided when using the nozzle 60.

It will be appreciated that many modifications of the embodiments described above are conceivable within the scope of the invention as defined by the appended claims.

Hereinabove, it has been described that the nozzle 60 is arranged in a mixer 24 in which fluidized dust is moistened before being mixed with a flue gas in a contact reactor 22. It will be appreciated that the nozzle 60 could also be utilized in other environments. The nozzle is particularly useful where there is dust present, and where there is a risk of moistened dust forming aggregates on the nozzle 60. One such embodiment is moistening of boiler ash, i.e., the spraying of water on boiler ash. Furthermore, the nozzle 60 may also be useful in other environments involving spraying liquid in confined spaces, where it is important that the spray of liquid is directed in a specific direction, to avoid spraying, inadvertently, on walls, roof, etc of the confined space.

To summarize, a nozzle for spraying a liquid comprises a central body which comprises a connecting portion for connecting the nozzle to a supply of liquid, an atomizing portion forming droplets of the liquid, and a liquid supply pipe forwarding liquid to the atomizing portion. The nozzle further comprises a sleeve mounted on the central body, the sleeve comprising a central aperture, which at least partly encloses the atomizing portion of the central body, and a spray angle controlling rim which at least partly encircles the atomizing portion.

While the invention has been described with reference to a number of preferred embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A nozzle for spraying a liquid, the nozzle comprising:
a central body which comprises a connecting portion for connecting the nozzle to a supply of liquid, an atomizing portion forming droplets of the liquid, and a liquid supply pipe forwarding liquid from the connecting portion to the atomizing portion and comprising a first opening in the connecting portion and a second opening in the atomizing portion, wherein
the atomizing portion comprises a deflecting plate extending from a starting portion, at which the deflecting plate is connected to the atomizing portion, to an end portion and arranged in the path of liquid ejected from the second opening to make the liquid flow over a deflection surface of the deflecting plate and form a spray, and wherein
the nozzle further comprises a sleeve mounted on the central body, the sleeve comprising a central aperture, which at least partly encloses the atomizing portion of the central body, and a spray angle controlling rim which at least partly encircles the atomizing portion in a position located between the second opening and the end portion of the deflecting plate.

2. A nozzle according to claim 1, wherein the nozzle is provided with a cleaning chamber defined by the atomizing portion and the central aperture of the sleeve.

3. A nozzle according to claim 2, wherein a portion of the deflection surface of the deflecting plate forms at least a portion of a side wall of the cleaning chamber.

4. A nozzle according to claim 1, wherein the deflection surface has a surface roughness, $R_a$, of 0.01 to 2.0 micrometer.

5. A nozzle according to claim 1, wherein an angle $\alpha$ between the deflection surface and a centre line of the liquid supply pipe is in the range of 15-25°.

6. A nozzle according to claim 1, wherein the deflecting plate has lateral edges extending from the deflection surface at an angle $\gamma$ of 10-40° to a normal line of the deflection surface.

7. A nozzle according to claim 1, wherein the spray angle controlling rim of the sleeve has an edge which forms an angle $\beta$ of 20-60° to a centre line of the sleeve.

8. A nozzle according to claim 7, wherein the edge of the spray angle controlling rim is inclined inwardly towards the centre line of the sleeve.

9. A nozzle according to claim 1, wherein a shortest distance between lateral edges of the deflecting plate and the spray angle controlling rim is 0 to 0.5 mm.

10. A nozzle for spraying a liquid, the nozzle comprising:
a central body which comprises a connecting portion for connecting the nozzle to a supply of liquid, an atomizing portion forming droplets of the liquid, and a liquid supply pipe forwarding liquid to the atomizing portion, and
a sleeve mounted on the central body, the sleeve comprising a central aperture, which at least partly encloses the atomizing portion of the central body, and a spray angle controlling rim which at least partly encircles the atomizing portion, wherein
the liquid supply pipe supplies the liquid within the central aperture of the sleeve.

11. A nozzle according to claim 10, wherein the nozzle is provided with a cleaning chamber defined by the atomizing portion and the central aperture of the sleeve, and flushed by a portion of the liquid supplied via the liquid supply pipe.

12. A nozzle according to claim 10, wherein the nozzle comprises a deflection plate deflecting at least a portion of the liquid supplied to the nozzle.

13. A nozzle according to claim 12, wherein the deflecting plate has a plane deflection surface.

14. A nozzle according to claim 10, wherein the edge of the spray angle controlling rim is inclined inwardly towards the centre line of the sleeve.

15. A mixer for moistening absorbent material for use in removing gaseous pollutants from a hot process gas comprises at least one nozzle for spraying liquid onto absorbent material present inside of the mixer, the nozzle comprising:
a central body which comprises a connecting portion for connecting the nozzle to a supply of liquid, an atomizing portion forming droplets of the liquid, and a liquid supply pipe forwarding liquid to the atomizing portion, and
a sleeve mounted on the central body, the sleeve comprising a central aperture, which at least partly encloses the atomizing portion of the central body, and a spray angle controlling rim which at least partly encircles the atomizing portion, wherein
the liquid supply pipe supplies the liquid within the central aperture of the sleeve.

16. A mixer according to claim 15, wherein the nozzle is provided with a cleaning chamber defined by the atomizing portion and the central aperture of the sleeve, and flushed by a portion of the liquid supplied via the liquid supply pipe.

17. A mixer according to claim 15, wherein the nozzle comprises a deflection plate deflecting at least a portion of the liquid supplied to the nozzle.

18. A mixer according to claim 17, wherein the deflecting plate has a plane deflection surface.

19. A method of atomizing a liquid, comprising supplying a liquid to a nozzle comprising:

a central body which comprises a connecting portion for connecting the nozzle to a supply of liquid, an atomizing portion forming droplets of the liquid, and a liquid supply pipe forwarding liquid to the atomizing portion, and a sleeve mounted on the central body, the sleeve comprising a central aperture, which at least partly encloses the atomizing portion of the central body, and a spray angle controlling rim which at least partly encircles the atomizing portion, wherein the liquid supply pipe supplies the liquid within the central aperture of the sleeve, and wherein the liquid is supplied to the nozzle and is atomized by the nozzle to form an essentially flat spray of liquid droplets.

20. A method of moistening absorbent material for use in removing gaseous pollutants from a process gas, the method comprises using a mixer having at least one nozzle for spraying liquid onto absorbent material present inside of the mixer, the nozzle comprising:

a central body which comprises a connecting portion for connecting the nozzle to a supply of liquid, an atomizing portion forming droplets of the liquid, and a liquid supply pipe forwarding liquid to the atomizing portion, and a sleeve mounted on the central body, the sleeve comprising a central aperture, which at least partly encloses the atomizing portion of the central body, and a spray angle controlling rim which at least partly encircles the atomizing portion, wherein the liquid supply pipe supplies the liquid within the central aperture of the sleeve, and wherein the liquid is supplied to the nozzle and is atomized by the nozzle to moisten at least a portion of the absorbent material present inside the mixer.

* * * * *